Dec. 30, 1930. A. W. BECKER 1,786,932
WINDSHIELD CLEARING DEVICE
Filed June 29, 1928
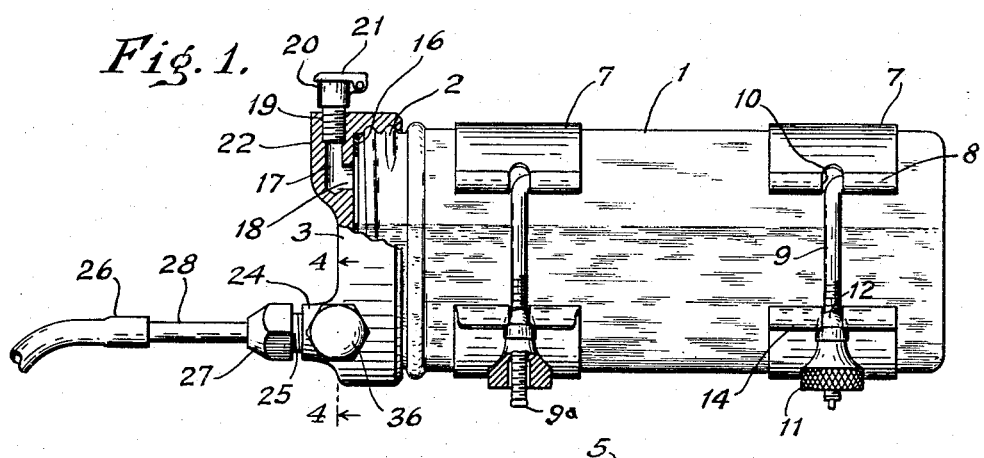
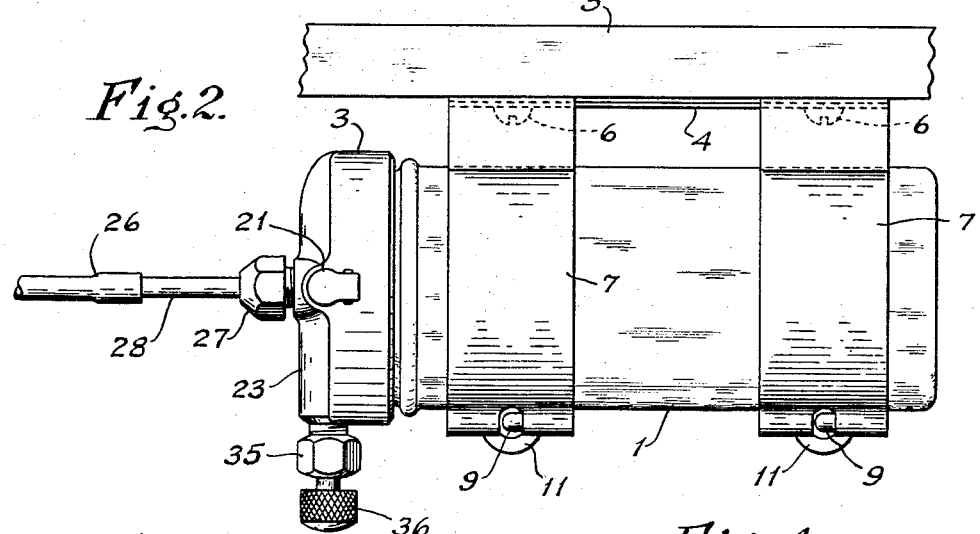
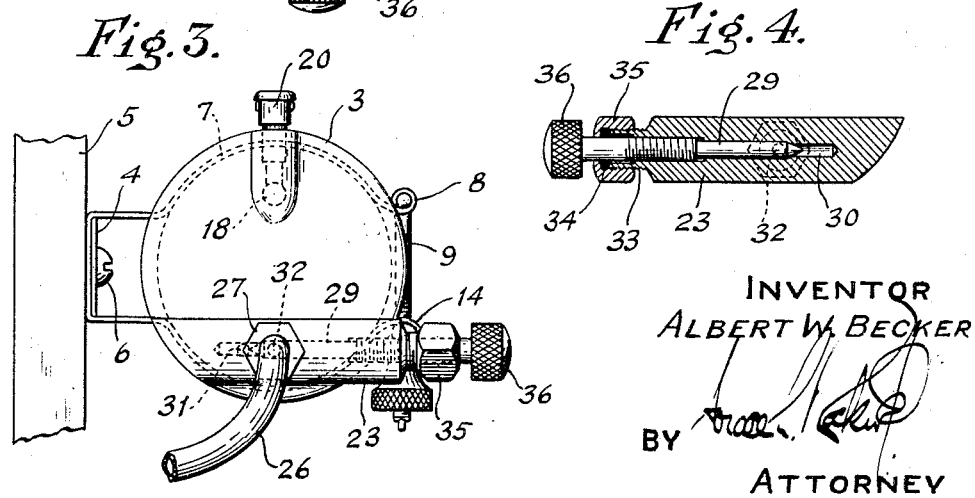
INVENTOR
ALBERT W. BECKER
BY
ATTORNEY Patented Dec. 30, 1930

1,786,932

UNITED STATES PATENT OFFICE

ALBERT W. BECKER, OF HARTFORD, CONNECTICUT

WINDSHIELD-CLEARING DEVICE

Application filed June 29, 1928. Serial No. 289,298.

My invention relates to windshield clearing devices.

It has for its object to provide improved reservoir means for such devices, wherein the structure is improved and the manufacture and use of the device facilitated. More particularly, my invention has for its object to provide improved reservoir means adapted to use in a liquid clearing mechanism of the type described and claimed in my copending application Serial No. 252,350, filed Feb. 6, 1928, and comprising improved reservoir holding and quick release means, an improved reservoir, and an improved reservoir cover construction. These and other advantages of my improvement will, however, hereinafter more fully appear.

In the accompanying drawings, I have shown for purposes of illustration, one embodiment which my invention may assume in practice.

In these drawings,—

Figure 1 is a side elevation of my improved reservoir means when attached in position above a windshield;

Fig. 2 is a plan view of the same, also showing the support therefor;

Fig. 3 is an end elevation from the cover carrying end, of the parts shown in Fig. 2, and Fig. 4 is a detail sectional view on line 4—4 of Fig. 1.

In this illustrative construction I have shown reservoir means of the general type described and claimed in my co-pending application mentioned above, and adapted to be used in lieu thereof, but embodying improved structure of the holding and releasing means, of the reservoir, and of the cover with the parts carried thereon, all as hereinafter more fully described.

In this construction, instead of utilizing a reservoir of metal or the like which is not transparent and a cover provided with a glass and providing a liquid level indicator or sight glass, I have provided a glass reservoir 1, herein of cylindrical form and carrying screw threads 2 to which an improved non-transparent or closed cover 3 is attached. Thus, it is always made possible for the user, even when the liquid is low or when the reservoir is attached at the upper edge of the windshield in a closed car, to see without difficulty just how much liquid remains within the reservoir. Further, it is at the same time made possible to simplify the construction of the cover and avoid possible leakage and breakage thereof while also obtaining the advantages hereinafter mentioned.

It will also be noted that herein the reservoir 1 is carried in an improved supporting frame comprising a longitudinally extending portion 4 adapted to be attached to a suitable support above the windshield, as for example a windshield frame 5, by suitable attaching means, such, for example, as screws 6, and also having at each end a pair of resilient reservoir holding clips 7. As shown, one of these clips 7 of each pair is disposed above and the other below the reservoir. More particularly, each is extended forward from the portion 4 at right angles thereto and then provided with a bent portion adapted to receive the cylindrical reservoir. Herein, the free ends of these clips 7 are also substantially spaced vertically. As illustrated, each of the top clips 7 is also provided with a turned-over end 8 receiving a laterally extending end on a swinging threaded holding member 9 having its upper end movable in a slot 10 between the ends of the portion 8. This member 9 in turn carries on its lower end a rotatable knurled cooperating holding member or nut 11, and herein also has a separate rounded and non-threaded portion 12 between it and a seat 13 formed by suitably turning up the free ends of the bottom member 7, as shown at 14, and providing a slot 15 in this turned up end through which the member 9 extends. Loss of the nuts 11 is also prevented by shaping the end of the threaded member 9 as shown at 9ª. Thus, it will be noted that whenever it is desirable to remove the reservoir 1 for refilling or the substitution of another reservoir, it is only necessary to give the nuts 11 a few turns in the proper direction to release the spring clips 7 and thereby release the reservoir for longitudinal withdrawal. Further, these nuts 11 are conveniently accessible even when the reservoir is close to the top of the car. Conversely, when the refilled reservoir is returned to position or a new reservoir is substituted, it may be quickly and readily tightened in position by reverse rotation of the nuts 11.

More particularly considering the cover 3, it will be noted that the cover is herein of metal and so threaded onto the threads 2 on one end of the reservoir 1 as to provide a fluid-tight fit, a suitable washer or gasket 16 also being provided between the reservoir and the cover in a usual manner. Attention is also directed to the fact that this cover 3 is provided near its front end with an air vent passage 17 having a laterally connected passage 18 at its inner end leading into the open end of the reservoir, while the passage 17 is provided at its outer end with a larger seat 19 adapted to receive a usual vent fixture 20 having a pivoted, and, if desired, resiliently connected, cover 21, adapted to be thrown back whenever desired. As shown, this vent connection is carried on a raised portion 22 formed on the outer end surface of the cover, and is adapted to be vertically disposed when the reservoir means is in position. Below this vent connection I have also provided an improved valve construction, the same herein being disposed at right angles to the vent connection and likewise provided in a raised portion 23 on the outer end surface of the cover 3. More particularly, it will be noted that below the vent connection is a terminal or outlet connection including a boss 24, carrying a longitudinally extending threaded outlet pipe 25 to which the usual flexible connection 26 is connected, the section 25 being removable upon suitable adjustment of a nut 27 and also carrying an extension 28 adapted to receive an end of the flexible connection 26. Disposed at right angles to this outlet, is a needle valve member 29 having its inner end adapted to seat in closed position in one end of a lateral passage 30 of reduced diameter and communicating with the reservoir through a small hole 31 in the cover and with the outlet pipe 28 through a laterally offset hole 32 on the opposite side of the valve seat. As shown, the hole 31 is, as preferably, also substantially smaller than the air vent hole provided by the passage 18. Thus, when the member 29 is adjusted longitudinally it will close or open the passage 30 and thereby close or open the port 31. Herein, this member 29 is rotatable and threaded in the portion 23 so that it may be moved into or out of closed or open position and left in any intermediate position, if desired. Further, the portion 23 is herein provided with a threaded end 33 having a packing 34 at its end and, with the packing, enclosed in an adjustable hollow nut 35, while the end of the member 29 which projects through the members 33, 34 and 35 is also provided with a knurled adjusting nut 36 to enable hand adjustment as desired.

As a result of my improved construction, it will be noted that the visibility of the liquid is substantially increased. Further, the glass containers are attractive in appearance, contrasting effectively with the polished metal of the clamps and cover, and may be very economically provided. Such glass containers further form, I find, a very convenient package for the clearing fluid, which is sold separately as a refill, and the use of the same as a reservoir substantially simplifies the refilling process, it only being necessary to remove the reservoir then in use, remove its cover, and place it upon the new reservoir, and then re-insert the latter in the clamp. Through the provision of the new clamps, the process of inserting a reservoir is also simplified, as the two clamps, even when released, provide an improved support, since they underlie both ends of the reservoir and thus support the same even before the clamps are connected, all danger of tilting or sliding out of the reservoir due to tilting and resultant liquid flow increasing the tendency to tilt, being thus minimized. Attention is also directed to the fact that the holding members may be swung up about their pivots, thereby enabling the clips to be forced back and the reservoir to be inserted from the side, if desired, where space conditions require. By the provision of my improved cover, not only is the possibility of leaks minimized, as above set forth, but the construction is simplified and all difficulty resulting from possible breakage of the sight glass in the cover is eliminated, dropping of the all-metal cover doing no damage whatever, whereas if a sight glass is broken in the hands of a user, the whole windshield clearer cannot be used until a new sight glass is obtained. By the use of my improved vent construction including particularly the passages leading downward and inward therefrom in the metal cover, it is also possible to obtain adequate vent action, the passages extending well below the top of the reservoir and in an improved and simplified manner made possible by the elimination of the sight glass. Through the use of the improved valve structure, it is also possible to control the flow within finer limits, and if desired, to set the valve and leave it in any desired position, while at the same time providing a liquid tight construction. These and other advantages of my improved construction will, however, be clearly apparent to those skilled in the art.

While I have in this application specifically described one embodiment which my invention may assume in practice, it will be understood that the same is shown herein for purposes of illustration only, and that the invention may be modified and embodied in various other forms without departing from its spirit or the scope of the appended claims.

What I claim as new and desire to secure by Letters Patent is:

1. A windshield clearing device having a reservoir provided with a closed and an open end, a cover on said open end and a pipe line connected to said cover, said reservoir being transparent and said cover non-transparent.

2. A windshield clearing device having a pipe line for delivering on the windshield, a transparent reservoir body having a closed and an open end, and a non-transparent removable cover on said open end and carrying a vent and a liquid outlet means, the latter connecting to said pipe line.

3. A windshield clearing device having a pipe line for delivering on the windshield, a transparent reservoir body having a closed end and an open end, and a removable non-transparent cover on said open end and carrying a vent and valved outlet means, the latter connected to said pipe line.

4. In a liquid reservoir for windshield clearing devices, a transparent reservoir body having an open threaded end, and a removable non-transparent cover threaded on said end and carrying an air vent and a liquid outlet means presenting apertures both for air and liquid in said cover.

5. A cover for clearing fluid liquid reservoirs having an end wall and a peripheral threaded portion and a vent at its periphery provided with a supply passage in said wall leading externally from a point nearer the axis than said threaded portion, and an outlet in said wall below said vent and likewise leading externally from a point nearer the axis than said threaded portion.

6. A cover for reservoirs for windshield clearing devices, having means for attaching the same to a reservoir and provided also with cooperating externally leading vent and outlet passages, a valve seat in said outlet passage inside said cover, and a valve adjustable inside said cover relative to said seat.

7. A cover for clearing fluid liquid reservoirs having an end wall and a peripheral threaded flange portion and provided with vertically spaced vent and outlet passages leading externally, a valve seat in said outlet passage inside said end wall and a valve movable in said cover relative to said seat and controlling the flow through said outlet passage.

8. A cover for reservoirs for windshield clearing devices, having means for attaching the same to a reservoir and provided also with externally leading vent and outlet passages, a valve seat in said outlet passage inside said cover, and a valve threaded in said cover and adjustable inside the latter relative to said seat.

9. A cover for clearing fluid liquid reservoirs having an end wall and a peripheral threaded portion and provided with vertically spaced vent and outlet passages leading laterally from inside said threaded portion and a valve threaded in said cover and movable therein transversely of the bottom thereof.

10. A cover for a clearing fluid reservoir having a peripheral threaded portion and an end wall and provided near the top of said wall with a large vent aperture leading out radially inside said wall in front of said threaded portion and near the bottom of said wall with a smaller outlet aperture, and a vent closure and valve means respectively controlling air and liquid flow through said apertures.

11. A cover for clearing fluid reservoirs having a closed end and carrying vent and valve means within the same, said vent means being adjacent the top and the valve means adjacent the bottom, and the latter including a threaded valve member movable transversely in said cover and projecting through one side thereof.

12. A cover for clearing fluid reservoirs having a vent and a liquid outlet below the latter, a passage in said cover disposed at right angles to said outlet and communicating therewith and providing a needle valve seat at one side of said outlet, a cooperating passage communicating with said outlet on the opposite side of said valve seat, and a needle valve in said cover and adapted to move longitudinally of said last mentioned passage and seat on said seat.

13. A cover for reservoirs for windshield clearing devices, having means for attaching the same to a reservoir and also an air vent and a liquid outlet therein, a valve seat in said outlet, a valve cooperating with said seat, a threaded portion on said cover through which said valve extends, and adjustable packing means threaded on said portion and through which said valve also extends.

14. A windshield clearing device having a reservoir support comprising a plurality of clamping members and a swinging member carried by one and carrying a member engaging the other and connecting the parts, and a reservoir grasped in said clamps between the ends of said reservoir.

15. A windshield clearing device having a reservoir support comprising a plurality of clamping members, each comprising two parts and a swinging member carried by one part and engaging the other and connecting the parts, and a reservoir grasped in said clamps.

16. In combination, a reservoir support providing spaced reservoir clamps, each comprising a plurality of clamping members and a swinging threaded member carried by one and carrying a nut engaging the other, a reservoir grasped in said clamps between the ends of said reservoir, and a cover on one end of said reservoir carrying a vent and outlet means.

17. A reservoir support for windshield clearing devices comprising upper and lower laterally extending spring clamps at each end thereof, the upper of said clamps carrying a pivoted threaded locking member provided with a threaded nut and the lower of said clamps providing an aperture for said locking member and a seat for said nut.

18. An article of manufacture comprising a reservoir support having a portion adapted to be attached above a windshield and a plurality of laterally spaced pairs of reservoir clamps, releasing means carried on said clamps, a transparent liquid reservoir having an open end and seated in said clamps at one side of said end, and a non-transparent cover member covering the end of said reservoir and disposed laterally beyond said clamps and carrying projecting air vent and valve means communicating with the open end of said reservoir through said cover.

In testimony whereof I affix my signature.

ALBERT W. BECKER.